(12) United States Patent
Xu et al.

(10) Patent No.: US 11,088,924 B2
(45) Date of Patent: Aug. 10, 2021

(54) NETWORK MANAGEMENT METHOD, DEVICE, AND SYSTEM

(71) Applicant: HUAWEI TECHNOLOGIES CO., LTD., Shenzhen (CN)

(72) Inventors: Ruiyue Xu, Shanghai (CN); Jun Yang, Shanghai (CN); Yan Li, Shanghai (CN); Kai Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/829,082

(22) Filed: Mar. 25, 2020

(65) Prior Publication Data

US 2020/0228419 A1 Jul. 16, 2020

Related U.S. Application Data

(63) Continuation of application No. PCT/CN2018/108899, filed on Sep. 29, 2018.

(30) Foreign Application Priority Data

Sep. 30, 2017 (CN) .......................... 201710920195.5

(51) Int. Cl.
*G06F 15/173* (2006.01)
*H04L 12/24* (2006.01)

(52) U.S. Cl.
CPC .............. *H04L 41/50* (2013.01); *H04L 41/04* (2013.01)

(58) Field of Classification Search
CPC .................. H04L 41/50; H04L 41/04

(Continued)

(56) References Cited

U.S. PATENT DOCUMENTS

2006/0195865 A1\* 8/2006 Fablet .................... H04L 67/42
725/32
2012/0278430 A1\* 11/2012 Lehane ............... H04L 41/5054
709/217

(Continued)

FOREIGN PATENT DOCUMENTS

CN 101150434 A 3/2008
CN 101184084 A 5/2008

(Continued)

*Primary Examiner* — Liang Che A Wang
(74) *Attorney, Agent, or Firm* — Rimon PC

(57) ABSTRACT

This application discloses a network management method, device, and system to solve the problem of low efficiency in network management by manual coordination. In one embodiment, the network management method includes: obtaining, by a first network management unit, network management service description information or network management indication information, where the network management indication information is used to determine the network management service description information. The network management service description information includes at least one of a managed object and management operation information, and the network management service description information is used to describe a management service supported by a network. The method further includes sending, by the first network management unit, the network management service description information or the network management indication information to a second network management unit.

17 Claims, 8 Drawing Sheets

(58) Field of Classification Search
USPC .................................. 709/217, 218, 219, 223
See application file for complete search history.

(56) References Cited

U.S. PATENT DOCUMENTS

| 2016/0353465 A1* | 12/2016 | Vrzic ................ H04W 28/0247 |
| 2017/0048008 A1* | 2/2017 | Yi ........................ H04B 17/382 |
| 2018/0013860 A1* | 1/2018 | Liu ......................... H04L 67/16 |

FOREIGN PATENT DOCUMENTS

| CN | 102118370 A | 7/2011 |
| CN | 106060900 A | 10/2016 |
| CN | 106550410 A | 3/2017 |
| CN | 106572516 A | 4/2017 |
| CN | 106657194 A | 5/2017 |
| CN | 106713406 A | 5/2017 |
| CN | 107155187 A | 9/2017 |
| EP | 3337094 A1 | 6/2018 |
| WO | 2017035735 A1 | 3/2017 |
| WO | 2017045345 A1 | 3/2017 |
| WO | 2017140356 A1 | 8/2017 |

\* cited by examiner

NETWORK MANAGEMENT METHOD, DEVICE, AND SYSTEM

CROSS-REFERENCE TO RELATED APPLICATIONS

This application is a continuation of International Application No. PCT/CN2018/108899, filed on Sep. 29, 2018, which claims priority to Chinese Patent Application No. 201710920195.5, filed on Sep. 30, 2017. The disclosures of the aforementioned applications are hereby incorporated by reference in their entireties.

TECHNICAL FIELD

Embodiments of the present application relate generally to the field of optical communications technologies, and more particular, to a network management method, device, and system.

BACKGROUND

A 5th-generation (5G) mobile communications system uses the most advanced mobile communications technologies, and can provide mobile users with an ultra-high bandwidth rate and more secure communication, to satisfy increasingly changing service requirements in different industries. The 5G system uses a network slicing technology to slice a physical network into a plurality of virtual end-to-end networks. Each virtual network may be referred to as a network slice (NS). Each network slice is logically independent, and each network slice includes an independent network function or a function-combined instance. For example, each network slice may include at least one network component, and each network component may provide a network service for external users through an exposed interface thereon, to fulfill service requirements of different tenants.

Currently, management personnel may manage, based on its own requirement, the network service provided by the network component for the external users. For example, the management personnel may send a management request to an operator, and the operator checks, based on the management request, a management service supported by the network component, and feeds back the management service supported by the network component to the management personnel, thereby implementing network service management. However, such a conventional network service management method requires management by manual negotiation, which is time-consuming and inefficient.

SUMMARY

This application provides a network management method, device, and system, to resolve a problem of low efficiency in existing network management by manual coordination.

To achieve the foregoing objective, the following technical solutions are used in this application.

A first aspect of this application provides a network management method. The method may include:

obtaining, by a first network management unit, network management service description information or network management indication information, where the network management indication information is used to determine the network management service description information, the network management service description information includes at least one of a managed object and management operation information, and the network management service description information is used to describe a management service supported by a network; and sending, by the first network management unit, the network management service description information or the network management indication information to a second network management unit.

Compared with the prior art, in this application, the first network management unit sends the management service supported by the network to the second network management unit in a form of description information, so that the second network management unit implements network management based on the description information. In this way, automatic network management is implemented through interaction between devices, thereby avoiding a problem of low efficiency in current network management by manual negotiation.

With reference to the first aspect, in a first possible implementation of the first aspect, the method further includes:

receiving, by the first network management unit, a network management service creation request sent by the second network management unit, where the network management service creation request carries the network management service description information or the network management indication information;

determining, by the first network management unit, a network management service instance based on the network management service description information; and sending, by the first network management unit, network management service instance information to the second network management unit, where the network management service instance information is used to describe the network management service instance.

The foregoing network management service creation request may be replaced with a network management service subscription request, to subscribe to a network management service provided by the first network management unit. The network management service provided by the first network management unit may be a network management service that is provided by the first network management unit and that is supported by a network.

In this way, when the second network management unit needs to manage the network, the second network management unit sends the network management service creation request to the first network management unit, so that the first network management unit determines the network management service instance based on the network management service description information, and sends information used to describe the determined network management service instance to the second network management unit. In this way, the second network management unit invokes the network management service instance based on the information, thereby implementing network management.

With reference to the first aspect or the first possible implementation of the first aspect, in a second possible implementation of the first aspect, the sending, by the first network management unit, the network management service description information or the network management indication information to a second network management unit includes:

sending, by the first network management unit, a network management request to the second network management unit, where the network management request carries the network management service description information or the network management indication information.

The network management request may be replaced with a network capability notification request, a network template loading request, a network template capability notification request, or the like. This is not limited.

In this way, the network management service description information or the network management indication information may be carried in a request and sent to the second network management unit, improving the security of information transmission.

With reference to the first aspect or any possible implementation of the first aspect, in a third possible implementation of the first aspect, the obtaining, by a first network management unit, network management service description information or network management indication information includes:

obtaining, by the first network management unit, a network template corresponding to the network, and obtaining the network management service description information or the network management indication information from the network template, where the network template includes the network management service description information or the network management indication information.

In this way, the network management service description information or the network management indication information may be carried in the network template. Because the network template may include a plurality of pieces of network management service description information or network management indication information, the first network management unit may obtain the plurality of pieces of network management service description information or network management indication information by using the network template, improving an information obtaining capability of the first network management unit.

With reference to the third possible implementation of the first aspect, in a fourth possible implementation of the first aspect, because the network template corresponds to the network, the network may be a network component or a network slice, the network component may include at least one network service, the network slice may include at least one network component, network management service description information corresponding to different network services may be the same or different, and network management service description information corresponding to different network components may be the same or different. To clarify which network component or network service corresponds to which piece of network management service description information, the network template may further include a correspondence between the network service or network component and the network management service description information.

For example, when the network is a network component, and the network component includes at least one network service, the network template further includes a correspondence between the network service and the network management service description information: at least one network service corresponds to one piece of network management service description information, or one network service corresponds to at least one piece of network management service description information.

When the network is a network slice, and the network slice includes at least one network component, the network template further includes a correspondence between the network management service description information and the network component: at least one network component corresponds to one piece of network management service description information, or one network component corresponds to at least one piece of network management service description information.

In this way, the network management service description information corresponding to the network component or the network service can be determined based on the correspondence in the network template.

With reference to the first aspect or any possible implementation of the first aspect, in a sixth possible implementation of the first aspect, before the sending, by the first network management unit, the network management service description information or the network management indication information to a second network management unit, the method further includes:

receiving, by the first network management unit, a query request sent by the second network management unit, where the query request is used to query the network management service description information supported by the first network management unit.

In this way, the network management service description information may be sent to the second network management unit only when the second network management unit needs to manage the network.

With reference to the first aspect or any possible implementation of the first aspect, in a seventh possible implementation of the first aspect, when the network is a network slice, the managed object is a network service or a network component; and when the network is a network component, the managed object is a network service.

With reference to the first aspect or any possible implementation of the first aspect, in an eighth possible implementation of the first aspect, the management operation information includes at least one of the following parameters: an operation type, an input parameter, an output parameter, and an operation status.

The operation type may be: scaling out, scaling in, modification, query, adding or deleting a tenant or user, enabling self-healing, enabling self-optimization, enabling or disabling energy saving, enabling smart data analysis, configuration, performance data reporting, fault data reporting, performance data subscription, performance data unsubscription, tenant granularity data reporting, user location reporting, or the like.

A second aspect of this application provides a first network management unit, including:

an obtaining unit, configured to obtain network management service description information or network management indication information, where the network management indication information is used to determine the network management service description information, the network management service description information includes at least one of a managed object and management operation information, and the network management service description information is used to describe a management service supported by a network; and a sending unit, configured to send the network management service description information or the network management indication information to a second network management unit.

For a specific implementation of the first network management unit, refer to a behavior function of the first network management unit in the network management method provided in the foregoing aspect or the possible implementations of the foregoing aspect. Details are not described herein again. Therefore, the first network management unit according to this aspect may achieve a beneficial effect the same as that achieved according to the foregoing aspect.

According to another aspect, an embodiment of the present invention provides a network management apparatus. The network management apparatus is in a product form of a chip, and the network management apparatus can implement a function implemented by the first network management unit in the foregoing method embodiments. The function may be implemented using hardware, or may be implemented by hardware executing corresponding software. The hardware or software includes one or more modules corresponding to the foregoing function.

In a possible design, a structure of the network management apparatus includes a processor and a communications interface. The processor is configured to support the first network management unit in performing the corresponding function in the foregoing method. The communications interface is configured to support communication between the first network management unit and another network element. The network management apparatus may further include a memory. The memory is configured to couple to the processor, and stores a program instruction and data that are required by the network management apparatus.

According to another aspect, an embodiment of the present invention provides a computer storage medium, configured to store a computer software instruction used by the foregoing first network management unit. The computer software instruction includes a program used to perform the foregoing network management method.

According to another aspect, an embodiment of the present invention provides a computer program product. The program product stores a computer software instruction used by the foregoing first network management unit. The computer software instruction includes a program used to perform the foregoing network management method.

A third aspect of this application provides a network management method, including:

receiving, by a second network management unit, network management service description information or network management indication information sent by a first network management unit, where the network management indication information is used to determine the network management service description information, the network management service description information includes at least one of a managed object and management operation information, and the network management service description information is used to describe a management service supported by a network; and managing, by the second network management unit, the network based on the network management service description information.

Compared with the prior art, in this application, the first network management unit sends the management service supported by the network to the second network management unit in a form of description information, and the second network management unit implements network management based on the description information. In this way, automatic network management is implemented through interaction between devices, thereby avoiding a problem of low efficiency in current network management by manual negotiation.

With reference to the third aspect, in a first possible implementation of the third aspect, the managing, by the second network management unit, the network based on the network management service description information includes:

sending, by the second network management unit, a network management service creation request to the first network management unit, where the network management service creation request or a subscription request carries the network management service description information or the network management indication information; and receiving, by the second network management unit, network management service instance information sent by the first network management unit, where the network management service instance information is used to describe a network management service instance, and the network management service instance corresponds to the network management service description information.

In this way, the second network management unit may invoke, after receiving the network management service instance information, the network management service instance to implement network management.

With reference to the third aspect or the first possible implementation of the third aspect, in a second possible implementation of the third aspect, before the receiving, by a second network management unit, network management service description information or network management indication information sent by a first network management unit, the method further includes:

sending, by the first network management unit, a query request to the second network management unit, where the query request is used to query the network management service description information supported by the first network management unit.

With reference to the third aspect or any possible implementation of the third aspect, in a third possible implementation of the third aspect, the receiving, by a second network management unit, network management service description information or network management indication information sent by a first network management unit includes:

receiving, by the second network management unit, a network template or network template indication information sent by the first network management unit, and obtaining the network management service description information or the network management indication information from the network template, where the network template indication information is used to obtain the network template, and the network template includes the network management service description information or the network management indication information.

In this way, the network management service description information or the network management indication information may be carried in the network template. Because the network template may include a plurality of pieces of network management service description information or network management indication information, the second network management unit may obtain the plurality of pieces of network management service description information or network management indication information by using the network template, improving an information obtaining capability of the second network management unit.

With reference to the third aspect or any possible implementation of the third aspect, in a fifth possible implementation of the third aspect, because the network template corresponds to the network, the network may be a network component or a network slice, the network component may include at least one network service, the network slice may include at least one network component, network management service description information corresponding to different network services may be the same or different, and network management service description information corresponding to different network components may be the same or different. To clarify which network component or network service corresponds to which piece of network management service description information, the network template may further include a correspondence between the network service or network component and the network management service description information.

For example, when the network is a network component, and the network component includes at least one network service, the network template further includes a correspondence between the network service and the network management service description information: at least one network service corresponds to one piece of network management service description information, or one network service corresponds to at least one piece of network management service description information.

When the network is a network slice, and the network slice includes at least one network component, the network template further includes a correspondence between the network management service description information and the network component: at least one network component corresponds to one piece of network management service description information, or one network component corresponds to at least one piece of network management service description information.

In this way, the network management service description information corresponding to the network component or the network service can be determined based on the correspondence in the network template.

With reference to the third aspect or any possible implementation of the third aspect, in a sixth possible implementation of the third aspect, when the network is a network slice, the managed object is a network service or a network component; and when the network is a network component, the managed object is a network service.

With reference to the third aspect or any possible implementation of the third aspect, in a sixth possible implementation of the third aspect, the management operation information includes: an operation type, an input parameter, an output parameter, and an operation status.

The operation type is any operation type of: scaling out, scaling in, modification, query, adding or deleting a tenant or user, enabling self-healing, enabling self-optimization, enabling or disabling energy saving, enabling smart data analysis, configuration, performance data reporting, fault data reporting, performance data subscription, performance data un-subscription, tenant granularity data reporting, user location reporting, or the like.

According to a fourth aspect of this application, a second network management unit is provided, including:

a receiving unit, configured to receive network management service description information or network management indication information sent by a first network management unit, where the network management indication information is used to determine the network management service description information, the network management service description information includes at least one of a managed object and management operation information, and the network management service description information is used to describe a management service supported by a network; and a management unit, configured to manage the network based on the network management service description information.

For a specific implementation of the second network management unit, refer to a behavior function of the second network management unit in the network management method provided in the foregoing aspect or the possible implementations of the foregoing aspect. Details are not described herein again. Therefore, the second network management unit according to this aspect may achieve a beneficial effect the same as that achieved according to the foregoing aspect.

According to yet another aspect, an embodiment of the present invention provides a network management apparatus. The network management apparatus is in a product form of a chip, and the network management apparatus can implement a function implemented by the second network management unit in the foregoing method embodiments. The function may be implemented using hardware, or may be implemented by hardware executing corresponding software. The hardware or software includes one or more modules corresponding to the foregoing function.

In a possible design, a structure of the network management apparatus includes a processor and a communications interface. The processor is configured to support the network management apparatus in performing the corresponding function in the foregoing method. The communications interface is configured to support communication between the network management apparatus and another network element. The network management apparatus may further include a memory. The memory is configured to couple to the processor, and stores a program instruction and data that are required by the network management apparatus.

According to yet another aspect, an embodiment of the present invention provides a computer storage medium, configured to store a computer software instruction used by the foregoing second network management unit. The computer software instruction includes a program used to perform the foregoing network management method.

According to yet another aspect, an embodiment of the present invention provides a computer program product. The program product stores a computer software instruction used by the foregoing second network management unit. The computer software instruction includes a program used to perform the foregoing network management method.

According to yet another aspect, an embodiment of the present invention provides a network management system, including: the first network management unit according to the foregoing second aspect and the second network management unit according to the foregoing fourth aspect.

DESCRIPTION OF EMBODIMENTS

Figure 1:
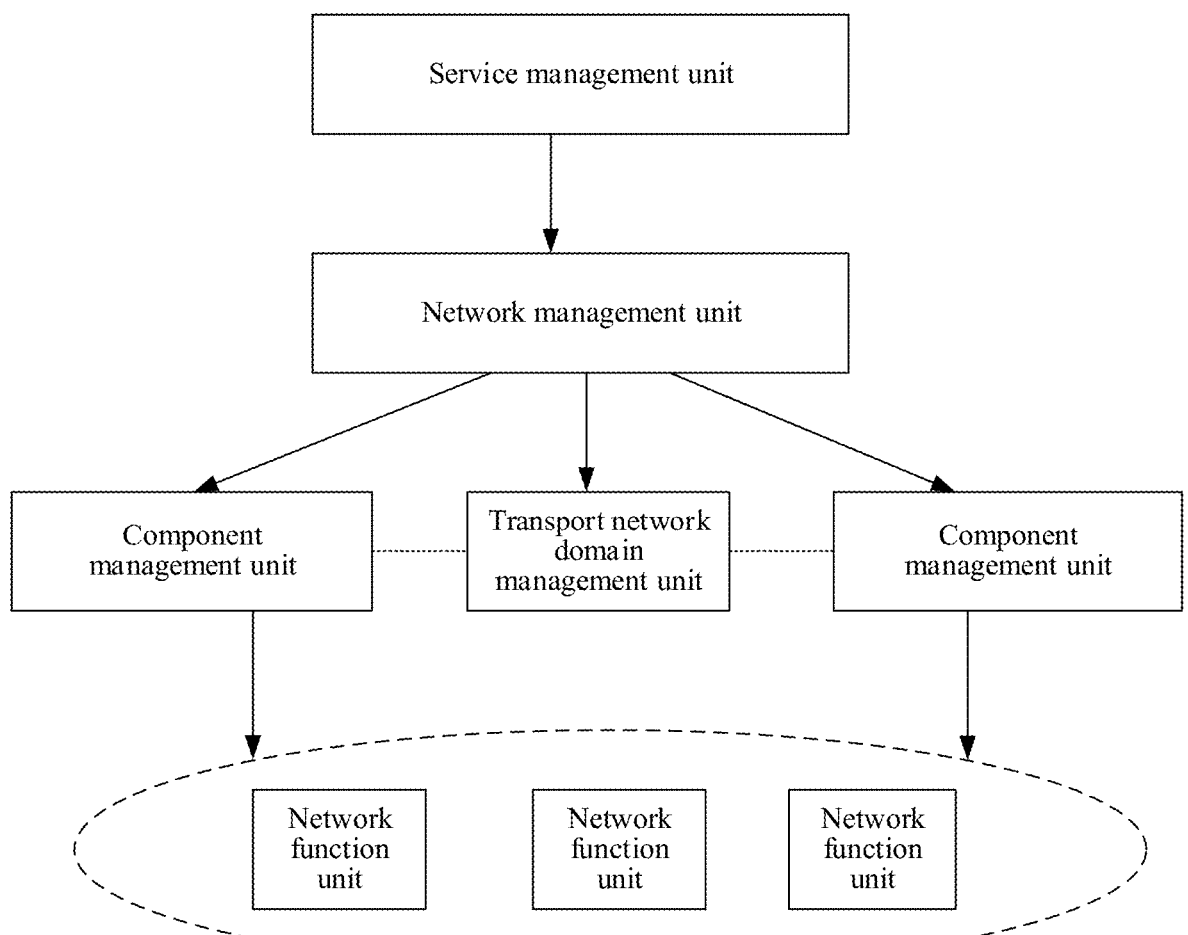
FIG. 1 is a simplified schematic diagram of a system architecture according to an embodiment of this application.

First, some terms in this application are described below.

Network slice: also referred to as a network slice instance, is a combination of a network function (NF) unit and a resource ensuring that a bearer service can meet a requirement of a service level agreement (SLA). The NFs and resources may be isolated in a hard manner (such as physical isolation) or be isolated in a soft manner (such as logical isolation) based on different requirements. Each network slice is logically independent. The network slice may include at least a core network (CN) part, an access network (AN) part, and a transport network (TN) part; or may include any one or two parts of the CN part, the AN part, and the TN part.

In this application, the network slice is a broad concept. A conventional network or a dedicated network may also be considered a network slice, and a network slice sub-network may also be considered a type of the network slice.

Network component: is a combination of a network function and a resource ensuring that the bearer service can reach the requirement of the SLA. Generally, the network component may be obtained by segmenting a network slice.

Network service: a service externally provided by the network component or the network slice.

The following describes implementations of this application in detail with reference to accompanying drawings.

A network management method provided in this application may be performed through interaction by a first network management unit and a second network management unit. The first network management unit and the second network management unit may be functional units in a network architecture shown in FIG. 1. For example, in a possible design, the first network management unit in this application is a network management unit in FIG. 1, and the second network management unit is a service management unit in FIG. 1; in another possible design, the first network management unit in this application is the network management unit in FIG. 1, and the second network management unit is a component management unit in FIG. 1; and in still another possible design, the first network management unit in this application is the component management unit in FIG. 1, and the second network management unit is the network management unit in FIG. 1.

The service management unit may be a service management function (SMF), and is mainly configured to receive a service requirement of a tenant, translate the service requirement to a requirement of the network slice, and perform service management. The service management unit may be deployed in an operation support system (OSS), or may be deployed out of the OSS. The service management unit may be an own management unit or operation unit of the tenant. The service management unit may be independently deployed, or may be integrated into a management unit (such as a business support system (BSS), a service management unit, an orchestration unit, or a service management and orchestration unit). It should be noted that, a name of the service management unit in FIG. 1 is not limited to SMF, and may alternatively be: a customer service management function unit, a communication service management function (CSMF) unit, or the like.

The foregoing network management unit may be a network manager (NM), and mainly includes one or both of an end-to-end network management function and an end-to-end network orchestration function. Some or all of the following functions may be included: end-to-end network management (such as network lifecycle management, network template management, network fault management, network performance management, and network configuration management), mapping of an end-to-end to a sub-network and a network function, coordination of network resources or sub-SLAs provided by different domains (such as an access network domain, a core network domain, a transmission domain), dividing network requirement information into sub-network requirement information, and uniform orchestration of sub-networks or network functions provided by all sub domains, so that the sub-networks or network functions provided by different sub domains can satisfy a requirement (such as an SLA requirement, a key performance indicator (KPI) requirement, and a quality of service (QoS) requirement) of a target service or the network. The network management unit can be deployed in the OSS, or may be deployed out of the OSS. The network management unit may be independently deployed, or may be integrated into a management unit (such as a network orchestration unit, a network management and orchestration unit, a service management unit, a service orchestration unit, a service management and orchestration unit, or a network function virtualization orchestrator (NFVO)). It should be noted that, a name of the network management unit in FIG. 1 is not limited to NM, and may alternatively be: a cross-domain management unit, a cross-domain network slice management unit, a network slice management function (NSMF), or the like.

The foregoing component management unit may be a domain manager (DM), and includes one or both of a sub-network management function and an orchestration function. Some or all of the following functions may be included: domain management (including sub-network lifecycle management (creation, updating, and deleting), sub-network fault management, sub-network performance management, sub-network configuration management, and the like), service management (including service lifecycle management, service fault management, service configuration management, and the like), network resource (such as an NF, a network element (NE)) coordination, for uniform orchestration. The component management unit can be deployed in the OSS, or may be deployed out of the OSS. The component management unit may be independently deployed, or may be integrated into a management unit (such as a network management unit, a network orchestration unit, a network management and orchestration unit, a network element management unit, a network function management unit, a service management unit, a service orchestration unit, a service management and orchestration unit, or an NFVO). It should be noted that, a name of the component management unit in FIG. 1 is not limited to DM, and may alternatively be: a domain slice management unit, network slice sub-network management unit, or the like.

It should be noted that, FIG. 1 is merely an exemplary architectural diagram. In FIG. 1, another function node, in addition to the function node in the solutions provided in this application, may further be included, such as a transport network domain management (TN-DM) unit, a network function (NF) unit, an NF manager (not shown in FIG. 1). Data or a signaling message may be transmitted between the component management units through the TN-DM unit. A plurality of NF units may form a network slice or a network slice sub-network. The NF manager includes one or all of the following functions: lifecycle management of a network function, fault management of a network function, performance management of a network function, configuration management of a network function, and the like. The name of the NF manager is not limited in this application, and may alternatively be an element manager (EM) unit. The NF manager may be deployed in the component management unit, that is, the component management unit includes a function of the NF manager, or may be deployed independent from the component management unit, and there is a network function management interface between the NF manager and the component management unit.

Figure 2:
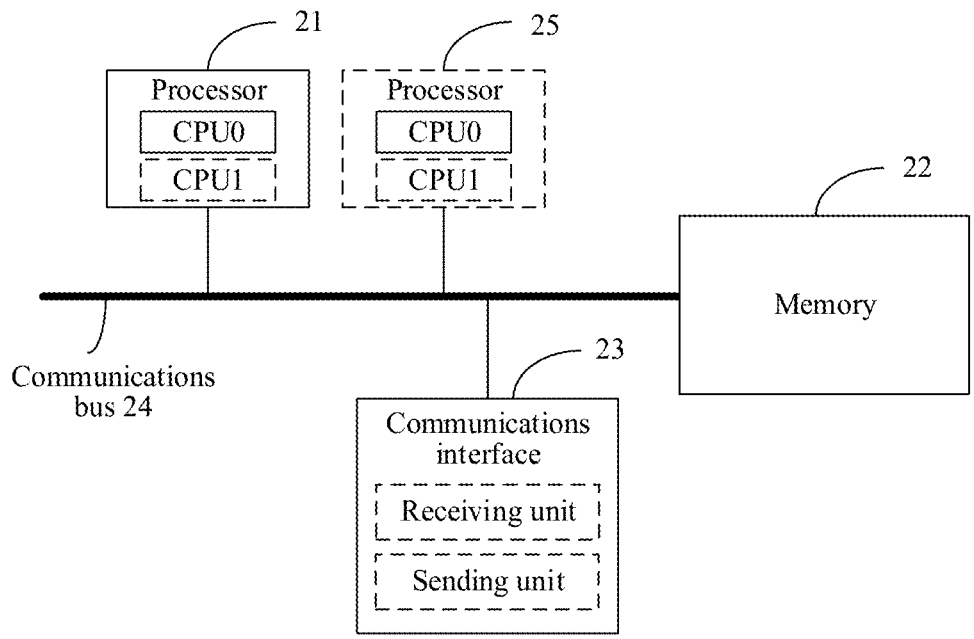
FIG. 2 is a schematic composition diagram of a first network management unit according to an embodiment of this application.

Specifically, the first network management unit in this application may include but is not limited to the components shown in FIG. 2: at least one processor 21, a memory 22, a communications interface 23, and a communications bus 24. It should be noted that, the device structure shown in FIG. 2 is not intended to limit the first network management unit. The first network management unit may include more or fewer components than those shown in the figure, or combine some components, or have different component layouts. This is not limited in the embodiment of the present invention. The following specifically describes the components of the management unit with reference to FIG. 2:

The processor 21 is a control center of the first network management unit, and may be a processor or may be a collective name of a plurality of processing elements. For example, the processor 21 may be a central processing unit (CPU), or an application specific integrated circuit (ASIC), or may be configured as one or more integrated circuits implementing this application, for example, one or more microprocessors (DSP) or one or more field programmable gate arrays (FPGA). The processor 21 may perform various functions of the first network management unit by running or executing a software program stored in the memory 22 and invoking data stored in the memory 22.

In an embodiment, the processor 21 may include one or more CPUs, for example, a CPU 0 and a CPU 1 shown in FIG. 2. In an embodiment, the first network management unit filter may include a plurality of processors, for example, the processor 21 and a processor 25 shown in FIG. 2. Each of the processors may be a single-core processor (single-CPU) or may be a multi-core processor (multi-CPU). Herein the processor may be one or more devices, circuits, and/or processing cores configured to process data (for example, a computer program instruction).

The memory 22 may be a read-only memory (ROM) or another type of static storage device that can store static information and a static instruction; or a random access memory (RAM) or another type of dynamic storage device that can store information and an instruction; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto. The memory 22 may exist independently, and is connected to the processor 21 through the communications bus 24. The memory 22 may alternatively be integrated with the processor 21. The memory 22 is configured to store a software program for performing the solutions provided in this application, and the processor 21 controls the performing.

The communications interface 23 is configured to communicate with another device or a communications network such as an Ethernet, a radio access network (RAN), or a wireless local area network (WLAN). The communications interface 23 may include a receiving unit for implementing a receiving function and a sending unit for implementing a sending function.

The communications bus 24 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 2, but this does not mean that there is only one bus or only one type of bus.

In this application, the communications interface of the first network management unit 23 may be configured to obtain network management service description information or network management indication information. The processor 21 of the first network management unit may determine the network management service description information based on the network management indication information. The memory 22 of the first network management unit may be configured to store the network management service description information. And the communications interface 23 of the first network management unit may be further configured to send the received network management service description information or the network management indication information to a second network management unit. For the network management service description information, the network management indication information, and a specific performing process of each component, refer to related description in the following method embodiments. Details are not described herein again.

Figure 3:
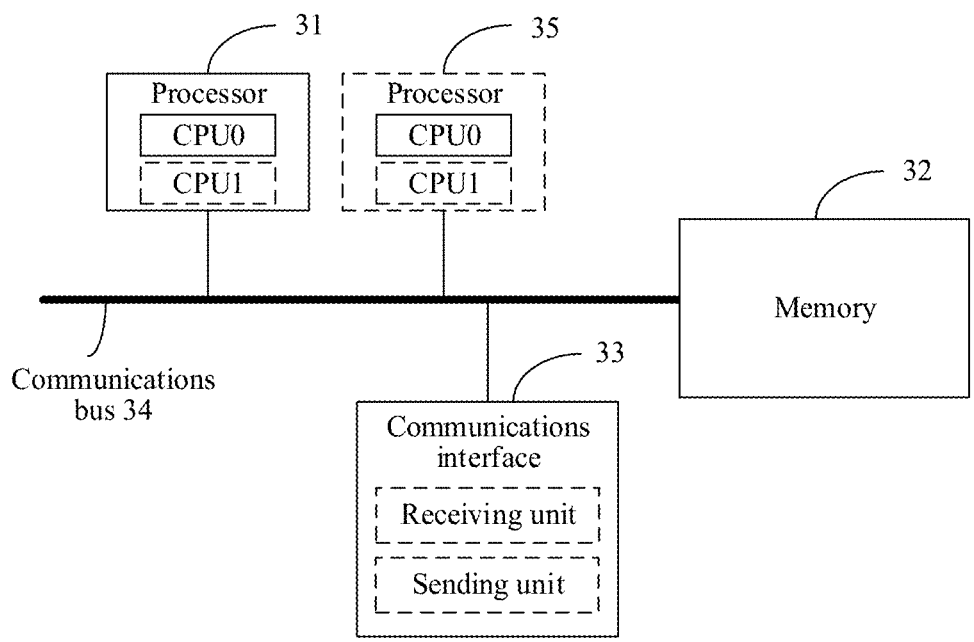
FIG. 3 is a schematic composition diagram of a second network management unit according to an embodiment of this application.

Specifically, the second network management unit in this application may include but is not limited to the components shown in FIG. 3: at least one processor 31, a memory 32, a communications interface 33, and a communications bus 34. It should be noted that, a device structure shown in FIG. 3 does not intend to limit the second network management unit. The second network management unit may include more or fewer components than those shown in the figure, or combine some components, or have different component layouts. This is not limited in the embodiment of the present invention. The following describes the components of the management unit with reference to FIG. 3:

The processor 31 is a control center of the second network management unit, and may be a processor or may be a collective name of a plurality of processing elements. For example, the processor 31 may be a CPU, or may be an ASIC, or may be one or more integrated circuits such as one or more DSPs or one or more FPGAs, configured to implement this application. The processor 31 may perform various functions of the second network management unit by running or executing a software program stored in the memory 32 and invoking data stored in the memory 32.

In an embodiment, the processor 31 may include one or more CPUs, for example, a CPU 0 and a CPU 1 shown in FIG. 3. In an embodiment, the second network management unit filter may include a plurality of processors, for example, the processor 31 and a processor 35 shown in FIG. 3. Each of these processors may be a single-CPU, or may be a multi-CPU. Herein the processor may be one or more devices, circuits, and/or processing cores configured to process data (for example, a computer program instruction).

The memory 32 may be a ROM or another type of static storage device that can store static information and a static instruction; or a RAM or another type of dynamic storage device that can store information and an instruction; or may be an EEPROM, a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto. The memory 32 may exist independently and be connected to the processor 31 through the communications bus 34. The memory 32 may alternatively be integrated with the processor 31. The memory 32 is configured to store a software program for performing the solutions provided in this application, and the processor 31 controls the performing.

The communications interface 33 is configured to communicate with another device or a communications network such as an Ethernet, a RAN, or a WLAN. The communications interface 33 may include a receiving unit for implementing a receiving function and a sending unit for implementing a sending function.

The communications bus 34 may be an ISA bus, a PCI bus, an EISA bus, or the like. The bus may be classified into an address bus, a data bus, a control bus, and the like. For ease of representation, only one thick line is used to represent the bus in FIG. 3, but this does not mean that there is only one bus or only one type of bus.

In this application, the communications interface 33 of the second network management unit may be configured to receive the network management service description information or the network management indication information sent by the first network management unit. The processor 31 of the second network management unit may be configured to manage the network based on the network management service description information. For the network management service description information, the network management indication information, and a specific performing process of each component (such as a performing process of the processor 31), refer to related description in the following method embodiments. Details are not described herein again.

The following describes the network management method provided in this application in detail.

Figure 4:
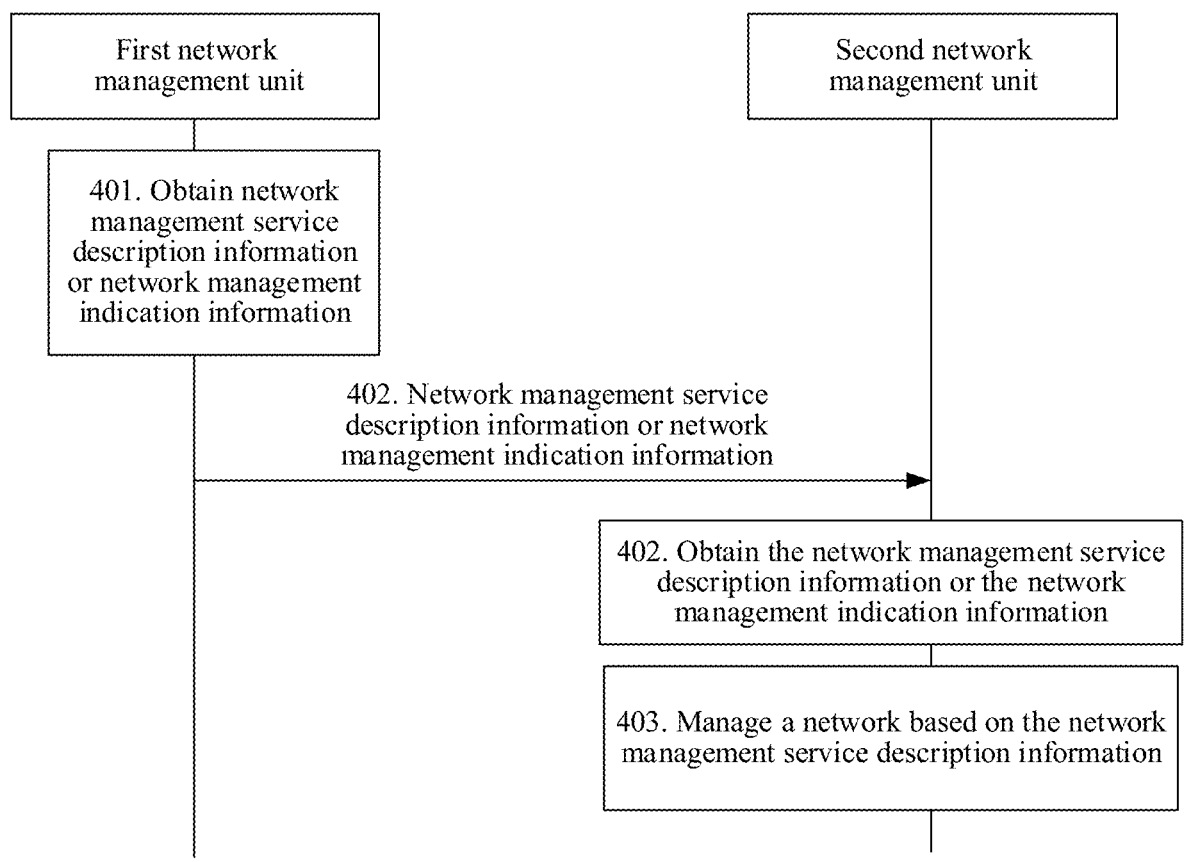
FIG. 4 is a flowchart of a network management method according to an embodiment of this application.

FIG. 4 is a flowchart of a network management method provided in this application. As shown in FIG. 4, the method may include the following steps.

Step 401: A first network management unit obtains network management service description information or network management indication information.

The first network management unit may be the network management unit or the component management unit in FIG. 1.

The network management service description information may be used to describe a management service supported by a network (such as a network slice deployed by the network management unit or a network component deployed by the component management unit) deployed (or created or instantiated) by the first network management unit. The management service may be managing the network by another function unit (such as the second network management unit or an upper-layer management unit), for example, managing a capacity of the network, or managing a configuration parameter of the network. The network management service description information may include at least one of a managed object and management operation information.

The managed object is used to represent which content or configuration parameter in the network deployed by the first network management unit can be managed by another function unit, to clarify the content or configuration parameter of the network that can be managed by the other function unit. The management operation information may be used to describe a management operation performed on the managed object. For example, the first network management unit deploys a network slice. When the network slice supports expansion management on a capacity of the network slice (for example, expanding the capacity from 1 million to 2 million), the managed object included in the network management service description information is the capacity of the network slice, and the management operation information corresponding to the managed object is: expansion, from 1 million to 2 million, and the like. For the managed object and the specific content included in the management operation information, refer to the following related descriptions. Details are not described herein again.

The network management indication information may be used to determine the network management service description information. For example, the network management indication information may be an identifier used to identify the network management service description information, and the identifier may be a digit, a letter, or the like. This is not limited. For example, a digit 1 may be used to identify network management service description information 1.

It should be noted that, that the network management service description information includes at least one of the managed object and the management operation information may mean: the network management service description information includes the managed object, or the network management service description information includes the management operation information, or the network management service description information includes the managed object and the management operation information. It should be noted that, when the network management service description information includes only the managed object, a management operation corresponding to the managed object may be a default operation; and when the network management service description information includes only the management operation information, it is considered by default that the managed object may be all manageable objects supported by the network.

Optionally, the first network management unit obtains the network management service description information or the network management indication information directly from a network designer or provider, or obtains the network management service description information or the network management indication information in the following manner: The first network management unit obtains a network template corresponding to the network, and obtains the network management service description information or the network management indication information from the network template, where the network template includes the network management service description information or the network management indication information.

The network template may be used to deploy the network. When the network is a network slice, the network template may be a network slice template; and when the network is a network component, the network template may be a network component template. The first network management unit may obtain the network template from the network designer or provider or from another network management unit.

Step 402: The first network management unit sends the network management service description information or the network management indication information to a second network management unit, and the second network management unit obtains the network management service description information or the network management indication information from the second network management unit.

When the first network management unit is the network management unit in FIG. 1, the second network management unit may be the service management unit in FIG. 1. When the first network management unit is the network management unit in FIG. 1, the second network management unit may be the component management unit in FIG. 1. When the first network management unit is the component management unit in FIG. 1, the second network management unit may be the network management unit in FIG. 1.

The first network management unit may directly send the network management service description information or the network management indication information to the second network management unit.

Alternatively, the network management service description information or the network management indication information may be carried in a network management request. The first network management unit sends the network management request to the second network management unit. The second network management unit receives the network management request, and obtains the network management service description information or the network management indication information from the network management request. The network management request is used to request the second network management unit to manage the network deployed by the first network management unit.

Alternatively, the first network management unit receives a query request sent by the second network management unit as a trigger condition for performing step 402. When the first network management unit receives the query request sent by the second network management unit, the first network management unit sends the network management service description information or the network management indication information to the second network management unit. The query request is used to query the network management service description information supported by the first network management unit.

Step 403: The second network management unit manages the network based on the network management service description information.

After the second network management unit receives the network management service description information in step 402, the second network management unit may directly manage the network based on the network management service description information. When the second network management unit receives the network management indication information in step 402, the second network management unit may first determine the network management service description information based on the network management indication information, and then manage the network based on the network management service description information.

That the second network management unit manages the network based on the network management service description information may include:

sending, by the second network management unit, a network management service creation request to the first network management unit, where the network management service creation request carries the network management service description information or the network management indication information, and the network management service creation request is used to request the first network management unit to determine a network management service instance;

receiving, by the first network management unit, the network management service creation request, and determining the network management service instance based on network management service description information, where the network management service instance corresponds to the network management service description information;

sending, by the first network management unit, network management service instance information to the second network management unit, where the network management service instance information is used to describe the network management service instance; and receiving, by the second network management unit, the network management service instance information sent by the first network management unit, so that the second network management unit determines the network management service instance based on the network management service instance information and invokes the network management service instance.

The second network management unit may determine, based on a management capability of the second network management unit, whether to provide a management service to a network deployed by the first network management unit. If the second network management unit determines that the second network management unit is capable of managing the network, the second network management unit is triggered to send the network management service creation request to the first network management unit. It should be noted that the network management service description information or the network management indication information included in the network management service creation request sent by the second network management unit to the first network management unit may be any one or more pieces of network management service description information or network management indication information in the network management service description information or the network management indication information sent by the first network management unit to the second network management unit. For example, the network management service description information sent by the first network management unit to the second network management unit includes: network management service description information 1 corresponding to a capacity of the network, network management service description information 2 corresponding to the configuration parameter of the network, and the like. If the second network management unit determines that the second network management unit is capable of managing the capacity of the network, the second network management unit sends the network management service description information 1 to the first network management unit.

The network management service creation request may be replaced with a network management service subscription request. The network management service subscription request carries the network management service description information or the network management indication information. The network management service subscription request is used to subscribe to a network management service provided by the first network management unit. In this way, the first network management unit determines, based on the request, a network management service instance corresponding to the network management service.

That the second network management unit manages the network based on the network management service description information may alternatively include:

sending, by the second network management unit, the network management service subscription request to the first network management unit;

receiving, by the first network management unit, the network management service creation request, and determining the network management service instance based on network management service description information, where the network management service instance corresponds to the network management service description information;

sending, by the first network management unit, network management service instance information to the second network management unit, where the network management service instance information is used to describe the network management service instance; and receiving, by the second network management unit, the network management service instance information sent by the network management unit, so that the second network management unit determines the network management service instance based on the network management service instance information and invokes the network management service instance.

When the network management service creation request includes the network management indication information, the first network management unit first determines the network management service description information based on the network management indication information included in the network management service creation request, and then determines the network management service instance based on the network management service description information.

The network management service instance may be an invoked interface corresponding to the managed object, or the like. The determining, by the first network management unit, the network management service instance based on the network management service description information may include: creating, by the first network management unit, a network management service instance based on the network management service description information, or using an existing available network management service instance. The creating, by the first network management unit, a new network management service instance based on the network management service description information may refer to that the first network management unit creates an invoked interface, so that the second network management unit can implement, through the invoked interface, management and operation on a managed object.

The network management service instance information may be an identifier of the network management service instance and is used to identify the network management service instance. The identifier may be a digit, a letter, or another identification character. This is not limited. For example, a letter A may be used to identify a network management service instance 1.

Compared with the prior art, in the solution shown in FIG. 4, the management service supported by the network deployed by the first network management unit is sent to the second network management unit in a form of information, so that the second network management unit implements network management based on the information. Automatic network management is implemented through interaction between devices, thereby avoiding a problem of low efficiency in current network management by manual negotiation.

In the solution shown in FIG. 4, the network deployed by the first network management unit may be a network slice or a network component. For example, when the first network management unit is the network management unit shown in FIG. 1, the network is a network slice; or when the first network management unit is the component management unit shown in FIG. 1, the network is a network component.

When the network is a network slice, and the network slice includes one or more network components, the managed object may be a network slice or a network component. For example, the managed object may be a capacity of the network slice, a configuration parameter of the network slice, or the like, or may be a capacity of a network component, a configuration parameter of a network component, or the like.

When the network is a network component, and the network component includes one or more network services, the managed object may be a network component or a network service. For example, the managed object may be a capacity of the network component, a configuration parameter of the network component, or the like, or may be a capacity of a network service, a configuration parameter of a network service, or the like. The network service may be any one of the following services: an access and mobility management function (AMF) service, a unified data management (UDM) service, a policy control function (PCF) service, an NEF service, an NRF service, session management function (SMF) service, an SMSF service, an authentication server function (AUSF) service, a network data analytics function (NWDAF) service, a 5G NodeB centralized unit (gNB CU) service, a 5G gNB ultra-reliable low-latency communication (gNBURLLC) service, a 5G gNB enhanced mobile broadband (gNBeMBB) service, or a 5G gNB massive internet of things (gNBmIoT) service.

The management operation information is used to describe a management operation specifically supported by the managed object. The management operation information may include, but is not limited to, any one or more of the following pieces of information: an operation type, an input parameter, an output parameter, and an operation status. For example, the management operation information may include the operation type, the input parameter, and the operation status; or the management operation information includes the operation type and the output parameter; or the management operation information includes the operation type, the input parameter, the output parameter, and the operation status.

The operation type may be any one of: scaling out, scaling in, modification, query, adding or deleting a tenant or user, enabling self-healing, enabling self-optimization, enabling or disabling energy saving, enabling smart data analysis, configuration, performance data reporting, fault data reporting, performance data subscription, performance data unsubscription, tenant granularity data reporting, user location reporting, or the like. The input parameter may be an original configuration parameter of the operated object. The output parameter may be a configuration parameter of the operated object after being managed by the second network management unit. The operation status indicates that the service is available or unavailable.

For example, the capacity of the network slice deployed by the first network management unit needs to be expanded from 1 million to 2 million. In this case, the operated object included in the network management service description information may be the capacity of the network slice, and the management operation information may be: the input parameter is 100, the output parameter is 200, and the operation status is available.

It should be noted that, the network management service description information includes but is not limited to the operated object and the management operation information, and may include other information. For example, the network management service description information may further include a readability indication or a writability indication corresponding to the operated object. The readability indication is used to indicate that the management operation information corresponding to the operated object can only be read by another network management device, but cannot be modified by the other network management device. The writability indication may be used to indicate that the management operation information corresponding to the operated object can be read and modified by another network management device.

In addition, in this embodiment of this application, when the network is a network slice, and the network slice includes a plurality of network components, different network components may correspond to a same piece of network management service description information, or a same network component corresponds to one or more pieces of network management service description information.

When the network is a network component, and the network component includes one or more network services, different network services may correspond to a same piece of network management service description information, or a same network service corresponds to a plurality of pieces of network management service description information.

The following describes the technical solutions provided in this application by using an example in which the first network management unit is the network management unit in FIG. 1, the second network management unit is the service management unit in FIG. 1, and the network is a network slice.

Figure 5:
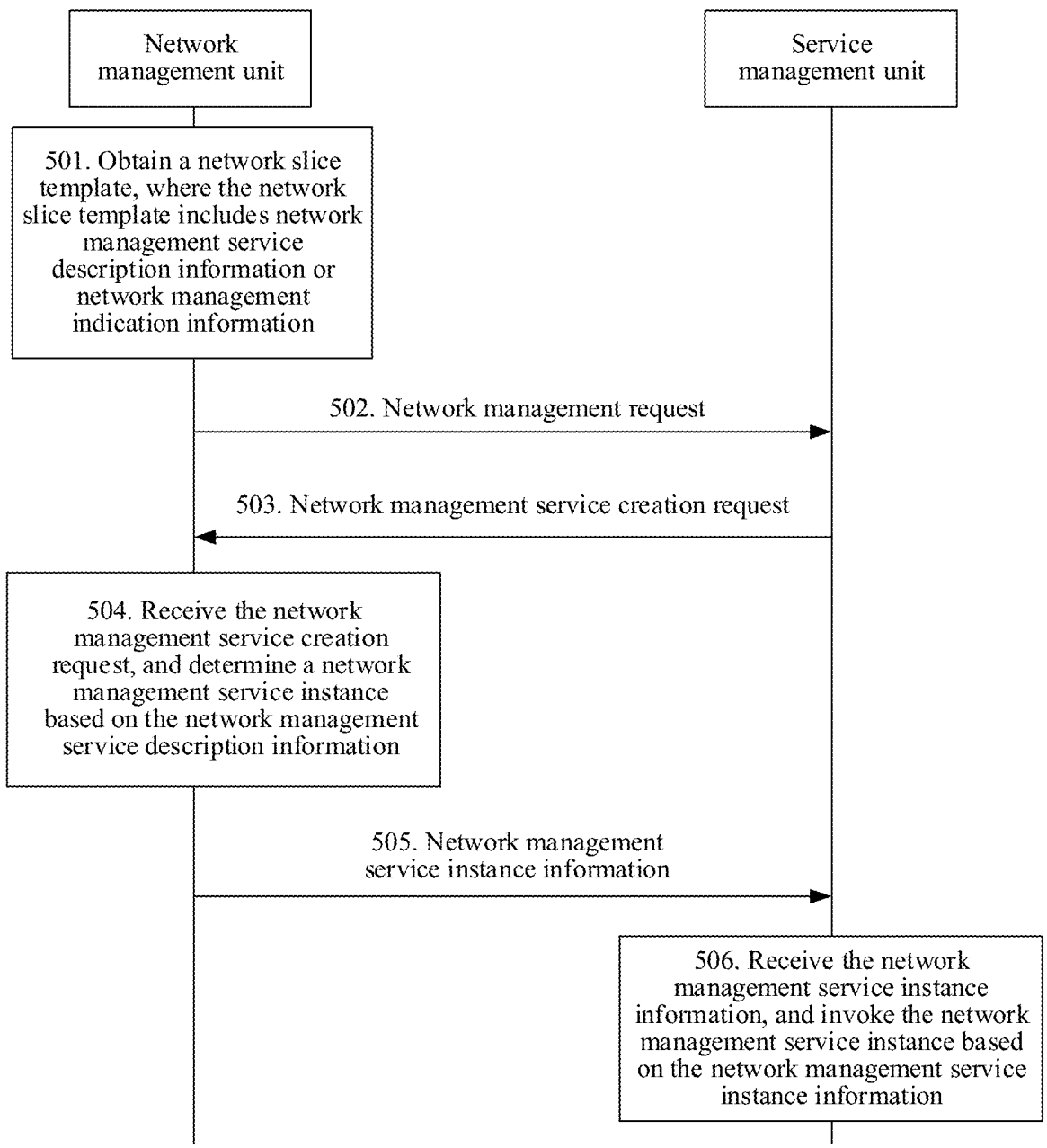
FIG. 5 is a flowchart of a network management method according to an embodiment of this application.

FIG. 5 is a flowchart of a network management method provided in this application. As shown in FIG. 5, the method includes the following steps.

Step 501: The network management unit obtains a network slice template, where the network slice template includes network management service description information or network management indication information.

The network slice template is used to deploy the network slice.

For related descriptions of the network management service description information and the network management indication information, refer to descriptions in step 401. Details are not described herein again.

The network management unit may obtain the network slice template from a network slice provider, and the network slice provider may be a network slice designer or a network slice template provider, for example, an operator or a device vendor.

Alternatively, the network slice template is stored in a database. The network management unit accesses the database and obtains the network slice template from the database.

Step 502: The network management unit sends a network management request to the service management unit.

The network management request carries the network management service description information or the network management indication information.

Step 503: The service management unit receives the network management request, and sends a network management service creation request to the network management unit.

The network management service creation request may be replaced with a network management service subscription request. For related descriptions of the network management service creation request and the network management service subscription request, refer to descriptions in step 402. Details are not described herein again.

Step 504: The network management unit receives the network management service creation request, and determines a network management service instance based on the network management service description information.

For the network management service instance, and a process of determining, by the network management unit, the network management service instance based on the network management service description information, refer to related descriptions in FIG. 4. Details are not described herein again.

Step 505: The network management unit sends network management service instance information to the service management unit.

The network management service instance information is as described in FIG. 4. Details are not described herein again.

Step 506: The service management unit receives the network management service instance information, and invokes the network management service instance based on the network management service instance information.

In this way, in the solutions shown in FIG. 5, the network management unit sends a management service supported by the network slice deployed by the network management unit and other information to the service management unit, to manage the network based on the information, implement automatic network management, and avoid a problem of low efficiency in current management by manual negotiation.

The following describes the technical solutions provided in this application by using an example in which the first network management unit is the component management unit in FIG. 1, the second network management unit is the network management unit in FIG. 1, and the network is a network component.

Figure 6:
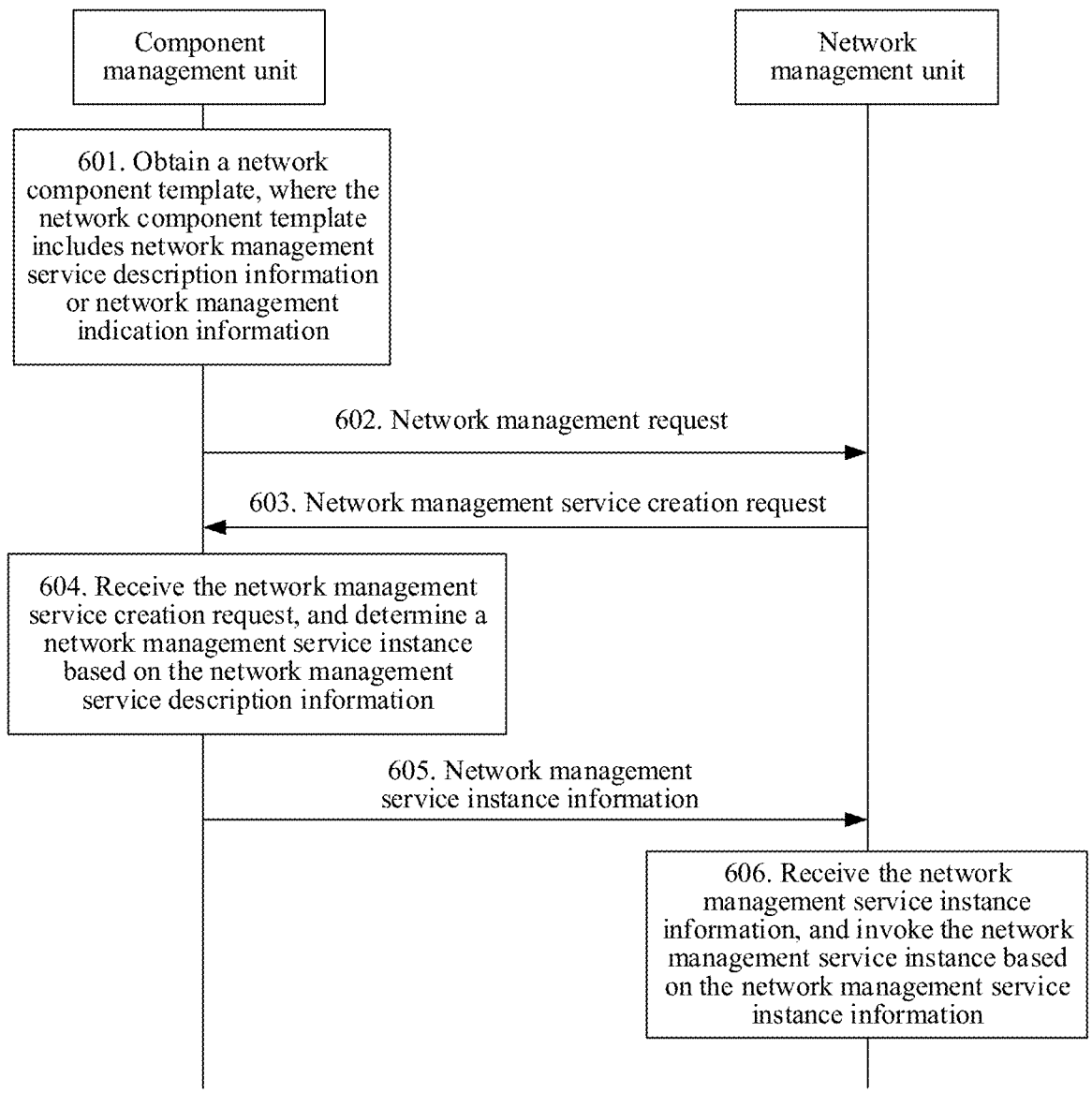
FIG. 6 is a flowchart of a network management method according to an embodiment of this application.

FIG. 6 is a flowchart of a network management method provided in this application. As shown in FIG. 6, the method includes the following steps.

Step 601: A component management unit obtains a network component template, where the network component template includes network management service description information or network management indication information.

The network component template is used to deploy the network component.

For related descriptions of the network management service description information and the network management indication information, refer to descriptions in step 401. Details are not described herein again.

The component management unit can obtain the network component template from a network component provider, and the network component provider may be a network component designer or a network component template provider, for example, a device vendor.

Alternatively, the network component template is stored in a database. The component management unit accesses the database and obtains the network component template from the database.

Step 602: The component management unit sends a network management request to the network management unit.

The network management request carries the network management service description information or the network management indication information.

Step 603: The network management unit receives the network management request, and sends a network management service creation request to the component management unit.

The network management service creation request may be replaced with a network management service subscription request. For related descriptions of the network management service creation request and the network management service subscription request, refer to descriptions in step 402. Details are not described herein again.

Step 604: The component management unit receives the network management service creation request, and determines a network management service instance based on network management service description information.

For the network management service instance, and a process of determining, by the component management unit, the network management service instance based on the network management service description information, refer to related descriptions in FIG. 4. Details are not described herein again.

Step 605: The component management unit sends network management service instance information to the network management unit.

The network management service instance information is as described in FIG. 4. Details are not described herein again.

Step 606: The network management unit receives the network management service instance information, and invokes the network management service instance based on the network management service instance information.

In this way, in the solutions shown in FIG. 6, the component management unit sends a management service supported by the network component deployed by the component management unit and other information to the network management unit, to manage the network component based on the information, implement automatic network management, and avoid a problem of low efficiency in current management by manual negotiation.

The following describes the technical solutions provided in this application by using an example in which the first network management unit is the network management unit in FIG. 1, the second network management unit is the component management unit in FIG. 1, the network is a network slice, and the network slice includes a plurality of network components.

Figure 7:
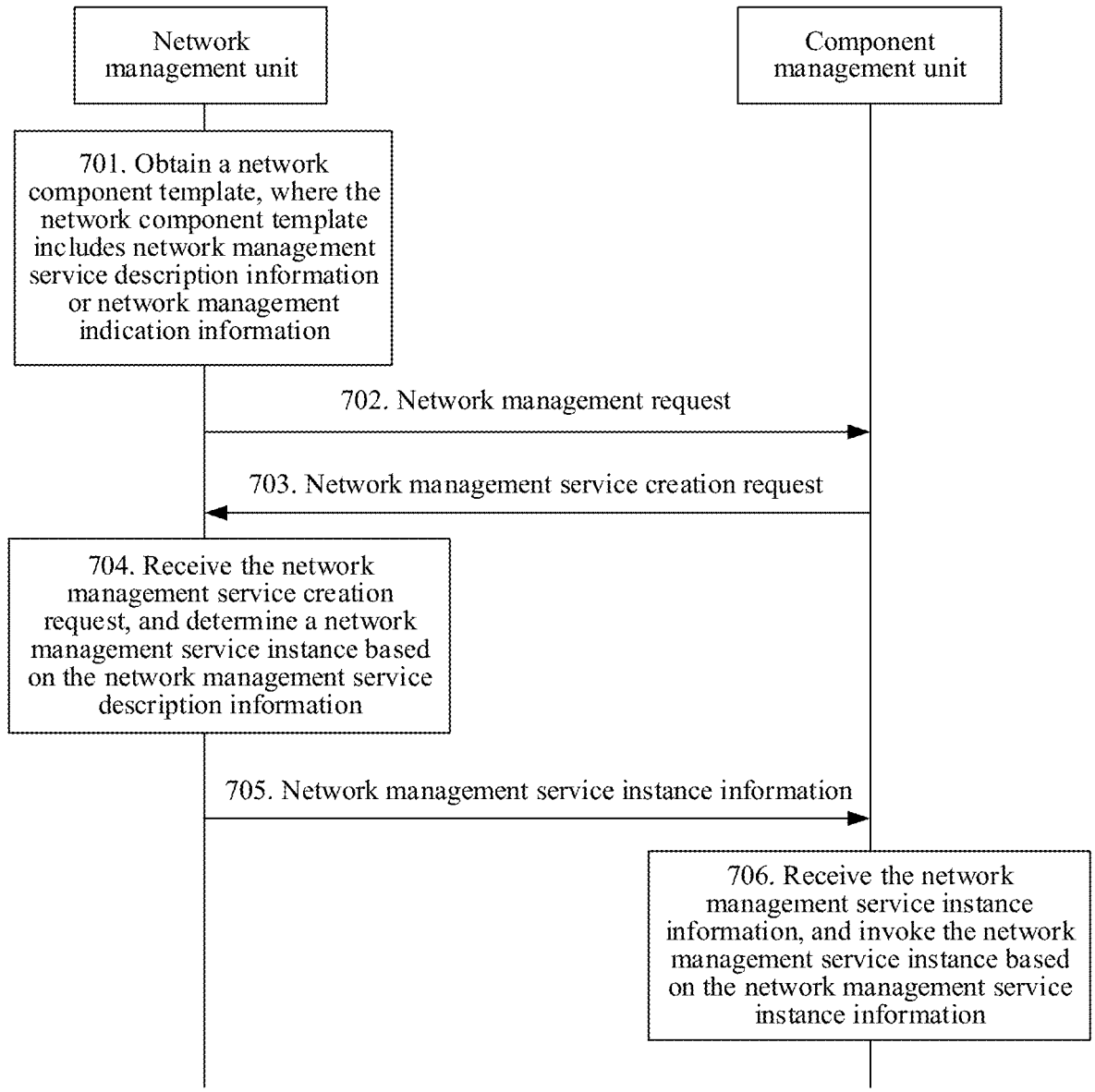
FIG. 7 is a flowchart of a network management method according to an embodiment of this application.

FIG. 7 is a flowchart of a network management method provided in this application. As shown in FIG. 7, the method includes the following steps.

Step 701: A network management unit obtains a network component template, where the network component template includes network management service description information or network management indication information.

The network component template is used to deploy the network component.

For related descriptions of the network management service description information and the network management indication information, refer to descriptions in step 401. Details are not described herein again.

The network management unit can obtain the network component template from a network component provider, and the network component provider may be a network component designer or a network component template provider, for example, a device vendor.

Alternatively, the network component template is stored in a database. The network management unit accesses the database and obtains the network component template from the database.

Step 702: The network management unit sends a network management request to the component management unit.

The network management request carries the network management service description information or the network management indication information.

Step 703: The component management unit receives the network management request, and sends a network management service creation request to the network management unit.

The network management service creation request may be replaced with a network management service subscription request. For related descriptions of the network management service creation request and the network management service subscription request, refer to descriptions in step 402. Details are not described herein again.

Step 704: The network management unit receives the network management service creation request, and determines a network management service instance based on the network management service description information.

For the network management service instance, and a process of determining, by the network management unit, the network management service instance based on the network management service description information, refer to related descriptions in FIG. 4. Details are not described herein again.

Step 705: The network management unit sends the network management service instance information to the component management unit.

The network management service instance information is as described in FIG. 4. Details are not described herein again.

Step 706: The component management unit receives the network management service instance information, and invokes the network management service instance based on the network management service instance information.

In this way, in the solutions shown in FIG. 7, the network management unit sends a management service supported by the network component deployed by the network management unit and other information to the component management unit, to manage the network component based on the information, implement automatic network management, and avoid a problem of low efficiency in current management by manual negotiation.

The foregoing mainly describes the solutions of this application from the perspective of interaction between nodes. It may be understood that to perform the foregoing functions, each node, for example, the first network management unit and the second network management unit, includes a corresponding hardware structure and/or software module for performing the functions. A person of ordinary skill in the art should easily be aware that, in combination with the examples described in the algorithms steps of the embodiments disclosed in this specification, the invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In this application, functional modules of the first network management unit and the second network management unit may be divided based on the foregoing method examples. For example, functional modules may be divided corresponding to functions, or two or more functions may be integrated into one processing module. The integrated module may be implemented in a form of hardware, or may be implemented in a form of a software functional module. It should be noted that, in this application, module division is exemplary, and is merely a logical function division. In actual implementation, another division manner may be used.

Figure 8:
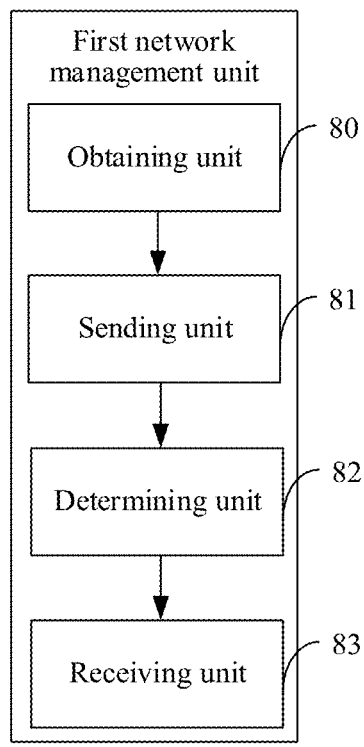
FIG. 8 is a schematic composition diagram of a first network management unit according to an embodiment of this application.

In a case in which the functional modules are divided corresponding to functions, FIG. 8 is a possible schematic composition diagram of a first network management unit. The first network management unit may be configured to implement a function of the first network management unit involved in the foregoing embodiments. As shown in FIG. 8, the first network management unit may include: an obtaining unit 80, a sending unit 81, a determining unit 82, and a receiving unit 83.

The obtaining unit 80 is configured to obtain network management service description information or network management indication information, for example, configured to support the first network management unit in performing step 401, step 501, step 601, and step 701.

The sending unit 81 is configured to send the network management service description information or the network management indication information to a second network management unit, for example, configured to support the first network management unit in performing step 402. The sending unit 81 may be further configured to send a network management request to the second network management unit, for example, configured to support the first network management unit in performing step 502, step 602, and step 702. The sending unit 81 may still be further configured to send network management service instance information to the second network management unit, for example, configured to support the first network management unit in performing step 505, step 605, and step 705.

The determining unit 82 is configured to determine a network management service instance based on the network management service description information, for example, configured to support the first network management unit in performing step 504, step 604, and step 704.

The receiving unit 83 is configured to receive a network management service creation request sent by the second network management unit, for example, configured to support the first network management unit in performing step 503, step 603, and step 703.

It should be noted that, all related content of each step in the foregoing method embodiments may be cited in function descriptions of a corresponding functional module. Details are not described herein again. The first network management unit provided in this embodiment of the present invention is configured to perform the foregoing network management method, and therefore can reach the same effects as that of the foregoing network management method.

Figure 9:
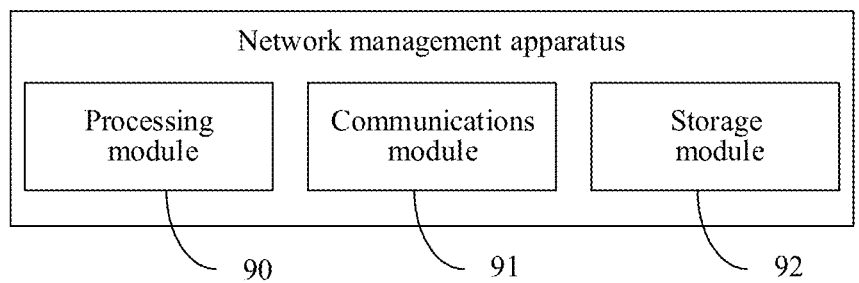
FIG. 9 is a schematic composition diagram of a network management apparatus according to an embodiment of this application.

In a case of using an integrated unit, FIG. 9 shows a network management apparatus. The network management apparatus is in a product form of a chip, configured to implement the function of the first network management unit in the foregoing embodiments. As shown in FIG. 9, the network management apparatus may include: a processing module 90 and a communications module 91.

The processing module 90 is configured to perform control and management on an action of the network management apparatus. For example, the processing module 90 is configured to support the network management apparatus in performing the process performed by the determining unit 803 and/or is configured to perform another process in the technology described in this specification. The communications module 91 is configured to support communication between the network management apparatus and another network entity, for example, communication between the network management apparatus and a functional module or a network entity that is shown in FIG. 1. The network management apparatus may further include a storage module 92, configured to store program code and data of the network management apparatus.

The processing module 90 may be a processor or a controller. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 91 may be a communications interface, a transceiver circuit, a communications interface, or the like. The storage module 92 may be a memory.

If the processing module 90 is a processor, the communications module 91 is a communications interface, and the storage module 92 is a memory, the network management apparatus involved in this embodiment of the present invention may be the network management apparatus shown in FIG. 2.

Figure 10:
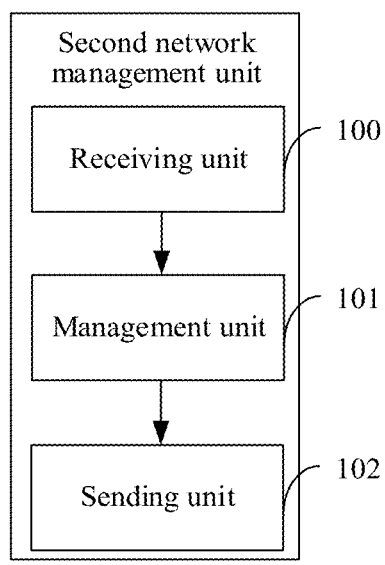
FIG. 10 is a schematic composition diagram of a second network management unit according to an embodiment of this application.

In a case in which the functional modules are divided corresponding to functions, FIG. 10 is a possible schematic composition diagram of a second network management unit. The second network management unit may be configured to implement a function of the second network management unit involved in the foregoing embodiments. As shown in FIG. 10, the second network management unit may include: a receiving unit 100, a management unit 101, and a sending unit 102.

The receiving unit 100 is configured to receive network management service description information or network management indication information sent by a first network management unit, for example, configured to support the second network management unit in performing step 402; further configured to receive a network management request sent by the first network management unit, for example, configured to support the second network management unit in performing step 502, step 602, and step 702; and further configured to receive network management service instance information sent by the first network management unit, for example, configured to support the second network management unit in performing step 505, step 605, and step 705.

The management unit 101 is configured to manage a network based on the network management service description information, for example, configured to support the second network management unit in performing step 403, step 506, step 606, and step 706.

The sending unit 102 is configured to send a network management service creation request to the first network management unit, for example, configured to support the second network management unit in performing step 503, step 603, and step 703.

It should be noted that, all related content of each step in the foregoing method embodiments may be cited in function descriptions of a corresponding functional module. Details are not described herein again. The second network management unit provided in this embodiment of the present invention is configured to perform the foregoing network management method, and therefore can reach the same effects as that of the foregoing network management method.

Figure 11:
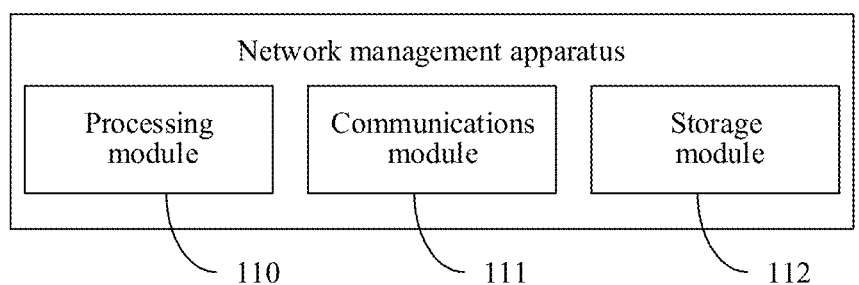
FIG. 11 is a schematic composition diagram of a network management apparatus according to an embodiment of this application.

In a case of using an integrated unit, FIG. 11 shows a network management apparatus. The network management apparatus exists in a product form of a chip, and the network management apparatus is configured to implement the function of the second network management unit in the foregoing embodiments. As shown in FIG. 11, the network management apparatus may include: a processing module 110 and a communications module 111.

The processing module 110 is configured to perform control and management on an action of the network management apparatus. For example, the processing module 110 is configured to support the network management apparatus in performing the process performed by the management unit 102 and/or is configured to perform another process in the technology described in this specification. The communications module 111 is configured to support communication between the network management apparatus and another network entity. The network management apparatus may further include a storage module 112 configured to store program code and data of the network management apparatus.

The processing module 110 may be a processor or a controller. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 111 may be a communications interface, a transceiver circuit, a communications interface, or the like. The storage module 112 may be a memory.

If the processing module 110 is a processor, the communications module 111 is a communications interface, and the storage module 112 is a memory, the network management apparatus involved in this embodiment of the present invention may be the network management apparatus shown in FIG. 3.

The foregoing descriptions about implementations allow a person skilled in the art to understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementations of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

What is claimed is:

1. A network management method, comprising:
    obtaining, by a first network management unit, network management service description information or network management indication information, wherein the network management indication information is used to determine the network management service description information, the network management service description information comprises at least one of a managed object and management operation information, and the network management service description information is used to describe a management service supported by a network;
    sending, by the first network management unit, the network management service description information or the network management indication information to a second network management unit;
    receiving, by the first network management unit, a network management service creation request sent by the second network management unit, wherein the network management service creation request carries the network management service description information or the network management indication information;
    determining, by the first network management unit, a network management service instance based on the network management service description information; and sending, by the first network management unit, network management service instance information to the second network management unit, wherein the network management service instance information is used to describe the network management service instance, and wherein the network management service instance information comprises an identifier of the network management service instance.

2. The method according to claim 1, wherein the sending, by the first network management unit, the network management service description information or the network management indication information to a second network management unit comprises:

sending, by the first network management unit, a network management request to the second network management unit, wherein the network management request carries the network management service description information or the network management indication information.

3. The method according to claim 1, wherein the obtaining, by a first network management unit, of network management service description information or network management indication information comprises:

obtaining, by the first network management unit, a network template corresponding to the network, wherein the network template comprises the network management service description information or the network management indication information; and obtaining, by the first network management unit, the network management service description information or the network management indication information from the network template.

4. The method according to claim 1, wherein before the sending, by the first network management unit, of the network management service description information or the network management indication information to a second network management unit, the method further comprises:

receiving, by the first network management unit, a query request sent by the second network management unit, wherein the query request is used to query the network management service description information supported by the first network management unit.

5. The method according to claim 1, wherein
when the network is a network slice, the managed object is a network service or a network component; or
when the network is a network component, the managed object is a network service.

6. The method according to claim 1, wherein the management operation information comprises at least one of the following: an operation type, an input parameter, an output parameter, or an operation status.

7. The method according to claim 1, wherein the method further comprises:

receiving, by a second network management unit, network management service description information; and
managing, by the second network management unit, the network based on the network management service description information.

8. The method according to claim 1, wherein the method further comprises:

sending, by the first network management unit, a network template or network template indication information to the second network management unit, wherein the network template indication information is used to obtain the network template, and the network template comprises the network management service description information or the network management indication information; and obtaining, by the second network management unit, the network management service description information or the network management indication information based on the network template.

9. A first network management unit, comprising a memory and at least one processor, wherein the memory is configured to store a program, and wherein the at least one processor is configured to invoke the program in the memory, wherein the program, when executed, instructs the at least one processor to:

obtain network management service description information or network management indication information, wherein the network management indication information is used to determine the network management service description information, the network management service description information comprises at least one of a managed object and management operation information, and the network management service description information is used to describe a management service supported by a network;

send the network management service description information or the network management indication information to a second network management unit;

receive, by the first network management unit, a network management service creation request sent by the second network management unit, wherein the network management service creation request carries the network management service description information or the network management indication information;

determine, by the first network management unit, a network management service instance based on the network management service description information; and send, by the first network management unit, network management service instance information to the second network management unit, wherein the network management service instance information is used to describe the network management service instance, and wherein the network management service instance information comprises an identifier of the network management service instance.

10. The first network management unit according to claim 9, wherein the at least one processor is configured to:

send a network management request to the second network management unit, wherein the network management request carries the network management service description information or the network management indication information.

11. The first network management unit according to claim 9, wherein the at least one processor is configured to:

obtain a network template corresponding to the network, and obtain the network management service description information or the network management indication information from the network template, wherein the network template comprises the network management service description information or the network management indication information.

12. The first network management unit according to claim 9, wherein the at least one processor is configured to:

receive a query request from the network management service description information supported by the first network management unit.

13. The first network management unit according to claim 9, wherein when the network is a network slice, the managed object is a network service or a network component; and when the network is a network component, the managed object is a network service.

14. The first network management unit according to claim 9, wherein the management operation information comprises at least one of the following: an operation type, an input parameter, an output parameter, and an operation status.

15. A system for managing network, comprises: a first network manager and a second network manager; wherein the first network manager is configured to obtain network management service description information or network management indication information, wherein the network management indication information is used to determine the network management service description information, the network management service description information comprises at least one of a managed object or management operation information, and the network management service description information is used to describe a management service supported by a network; and wherein the first network manager is further configured to send the network management service description information or the network management indication information to a second network management unit;

the second network manager is configured to receive the network management service description information and to manage the network based on the network management service description information;

the second network manager is configured to send a network management service creation request to the first network manager, wherein the network management service creation request carries the network management service description information or the network management indication information; and the first network manager is configured to determine a network management service instance based on the network management service description information and to send network management service instance information to the second network manager, wherein the network management service instance information is used to describe the network management service instance, and wherein the network management service instance information comprises an identifier of the network management service instance.

16. The system according to claim 15, wherein:

the first network manager is configured to send a network management request to the second network manager, wherein the network management request carries the network management service description information or the network management indication information.

17. The system according to claim 15, wherein the first network manager is configured to receive a query request from the second network manager, wherein the query request is used to query the network management service description information supported by the first network manager.

* * * * *